United States Patent [19]

Kitagawa

[11] 4,269,477
[45] May 26, 1981

[54] SYMMETRICAL OBJECTIVE

[75] Inventor: Masamichi Kitagawa, Tokyo, Japan

[73] Assignee: Konishiroku Photo Industry Co., Ltd., Tokyo, Japan

[21] Appl. No.: 860,441

[22] Filed: Dec. 14, 1977

[30] Foreign Application Priority Data

Dec. 22, 1976 [JP] Japan ................ 51-153342

[51] Int. Cl.³ .............................................. G02B 9/62
[52] U.S. Cl. ................................................ 350/464
[58] Field of Search ................................... 350/215

[56] References Cited

U.S. PATENT DOCUMENTS

| | | | |
|---|---|---|---|
| 3,088,371 | 5/1963 | Lowenthal | 350/215 |
| 3,185,031 | 5/1965 | Betensky | 350/215 |
| 3,439,976 | 4/1969 | Lynch | 350/215 |
| 3,871,749 | 3/1975 | Harada | 350/215 |
| 3,922,071 | 11/1975 | Kitagawa | 350/215 |
| 4,061,419 | 12/1977 | Price | 350/215 |

*Primary Examiner*—Conrad J. Clark
*Attorney, Agent, or Firm*—Lane, Aitken, Dunner & Ziems

[57] ABSTRACT

Six groups of six lens elements for use in the photographic arts include a front lens group of three groups of three lens elements, and a back lens group of three groups of three lens elements. The front and back lens groups are symmetrically arranged on either side of a diaphragm mounted therebetween. The whole objective is extremely small in size and has little variation in distortion aberration caused by variation in magnification. In addition, both the image field of curvature and the coma aberration are sufficiently corrected for field angles up to 70° or so under unitary magnification.

4 Claims, 12 Drawing Figures

SYMMETRICAL OBJECTIVE

BACKGROUND OF THE INVENTION

This invention relates to a symmetrical objective for use in the photographic arts field.

Generally lenses intended for use in the photographic arts are required as a condition of their performance to provide a sufficient imaging quality at or near unity magnification and, from a commerical standpoint to provide a field angle as wide as possible with a lens shape as small as possible.

There are advantages and disadvantages in conventional well-known lens systems which may be utilized as wide angle lenses. A symmetrical objective has not been provided which, from a performance standpoint, has little variation in distortion aberration in response to a change in magnification, a small image field of curvature at wide angles of view in which the field angle under a unity magnification is 70° or so, having a good correction of coma flare, and from a structural standpoint having a simple lens configuration, which is small in size and less expensive to produce.

BRIEF SUMMARY OF THE INVENTION

In view of the above, it is an object of the present invention to provide an improved and useful symmetriobjective for use in the photographic arts.

Another object of the present invention is to provide a symmetrical objective which, from a performance standpoint, has little variation in distortion aberration in response to a change in magnification, small image field of curvature for a wide angle of view in which a field angle under a unity magnification is 70° or so, and further having a good correction of coma flare.

Still another object of the present invention is to provide an improved symmetrical objective which as its structural standpoint has an extremely simple lens configuration, which is small in size and inexpensive.

Other objects of the present invention will be apparent from the following description of the invention in reference to the accompanying drawings.

BRIEF DESCRIPTION OF THE DRAWING

The above description, as well as further objects, features, and advantages of the present invention will be more fully understood by reference to the following description of a preferred but nonetheless illustrative embodiment in accordance with the present invention, when taken in connection with the accompanying drawing, wherein.

DESCRIPTION OF THE PREFERRED EMBODIMENT

Figure 1A:
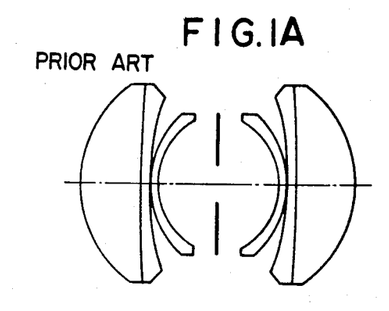
FIG. 1A, FIG. 1B, and FIG. 1C are each diagrammatic views showing a conventional, prior art symmetrical objective.
Figure 1B:
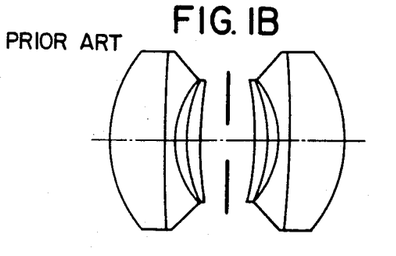
Figure 1C:
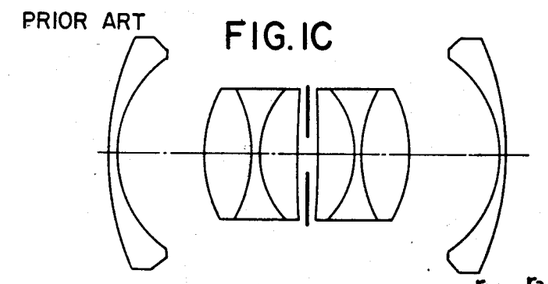

The conventional well-known symmetrical objectives which may be made into a wide angle lens can be classified into three categories as shown in FIGS. 1A, 1B and 1C. When these lens are applied in the photographic arts, the following disadvantages are found.

First, for the type shown in FIG. 1(A), a superior quality balance may be expected between the image field and coma flare aberration at or near unity magnification and thus this type is suitable for use as a wide angle lens. Howver, it has the inevitable disadvantages of extreme variation in distortion aberration caused by a change in magnification, and a relatively long length for the entire objective due to the concave inner lenses holding the diaphragm therebetween (0.5 to 0.6 f, where f is a composite focal length of whole objective).

On the other hand, the type shown in FIG. 1B has a shortened overall objective length with a low variation in distortion aberration caused by a variation in magnification. If this type is made into a wide angle lens, it will show an excessively high image field of curvature. If this image field of curvature is to be corrected, an inferior coma aberration can be expected, requiring an extended overall length of the objective in order to restore the coma aberration. In addition variation in distortion aberration is increased by the variable magnification feature of this objective type. Consequently miniaturization of this objective type becomes impossible.

The field angle which may be employed in the type shown in FIG. 1B is approximately 60° in a conventional well-known objective.

For the type shown in FIG. 1C, the disadvantages found in the above described symmetrical objectives of FIGS. 1A and 1B may be eliminated sufficiently. However, the disadvantage of having an extremely long objective length (0.8 to 0.9 f) is found and causes the foregoing desires to be impossible.

In order to accommodate for the above-mentioned disadvantages found in the symmetrical objectives which are shown in FIGS. 1A, 1B and 1C and which are known in the conventional prior art, the present inventor and others researched these problems, developed two novel objectives, and filed a patent application with the Japanese Patent Office. These two objectives were disclosed to the public under U.S. Pat. No. 3,922,071. These two new objectives are, as shown in FIGS. 2A and 2B, comprised of four groups and six groups, respectively, and provide an objective having (1) small variation in distortion aberration caused by a variation in magnification, (2) small variation in image field curvature even with a wide angle of view, and (3) small configuration for the whole objective.

However, the objective disclosed in the above-mentioned U.S. Pat. No. 3,922,071 is one which is suitable for fulfilling the foregoing desires, and even in this condition, a whole length of the objective is approximately 0.4 f. In the objective shown in FIG. 2A, the outermost lens layer has an extreme thickness and in the objective shown in FIG. 2B, it is comprised of eight lenses and it is not necessarily a smaller and less expensive lens.

Figure 2A:
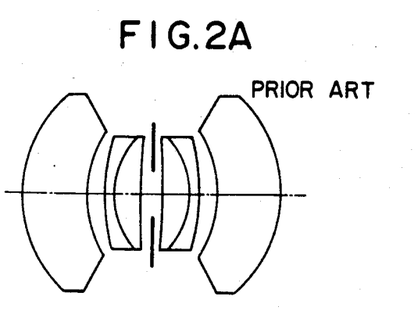
FIG. 2A and FIG. 2B are each diagrammatical views illustrating prior art symmetrical objectives disclosed in U.S. Pat. No. 3,922,071.
Figure 2B:
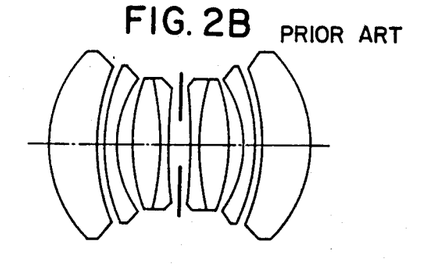

Thus, the inventor has eliminated the disadvantages found in the objective shown in FIGS. 2A and 2B. When the inventor started to develop a new objective, he selected the type shown in FIG. 1B which has a small number of lenses forming an objective and is relatively easy to miniaturize. As a result of studying and developing this type of lens, the inventor has devised a simpler, smaller or more compact and less expensive symmetrical objective. This objective structure, from the performance standpoint, has little variation in distortion aberration caused by variation of magnification, little image field curvature even when the field angle is an angle of 70° or so under a unity magnification and a coma flare which is well corrected.

Figure 3:
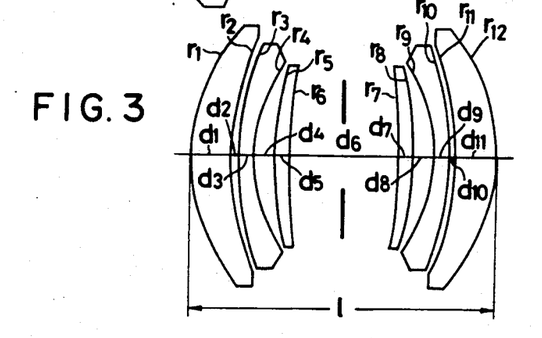
FIG. 3 is a basic diagrammatic view showing the present invention.

This newly devised objective is shown in FIG. 3 in its basic configuration and provides a symmetrical objective composed of a front group comprising three groups of three lenses, namely, a first lens of positive meniscus, a second lens of negative meniscus and a third lens of positive meniscus of which the convex surfaces are arranged in sequence from the object and directed toward the object; and of a rear group of fourth, fifth and sixth lenses arranged in complete symmetrical form with respect to the diaphragm arranged rearwardly of the third lens, in such a manner that the following conditions are fulfilled, $$0.31f \geq 1 \geq 0.20f \quad \text{I.}$$
$$0.20f > r_1 = -r_{12} > 0.12f, \quad \text{II.}$$
$$0.17f > r_4 = -r_9 > 0.11f$$
$$0.06/f < \frac{n_2 - 1}{r_3} + \frac{1 - n_1}{r_2} = \frac{n_5 - 1}{-r_{10}} + \frac{1 - n_6}{-r_{11}} < -0.06/f$$

wherein a composite focal length of a whole system is f, a whole length of lens is l, radii of curvature of the lens counted in sequence from the object are $r_1, r_2, \ldots r_{12}$, axial air gaps and thickness of the lenses are $d_1, d_2, \ldots d_{11}$, and a refractive index with respect to a line d of the composed lenses are $n_1, n_2, \ldots n_6$.

A detailed description is provided below on the configuration of symmetrical objectives in accordance with the present invention and the necessity of the above described condition.

The reason why the inventor selected the type shown in FIG. 1B is that there are fewer lenses forming the objective, and the disadvantages found in this type can be overcome to enable relatively easy miniaturization.

The features and the disadvantages found in the type of objective shown in FIG. 1B have been previously described and further detailed investigation thereof showed the following defects.

When it is desired to have a wide field angle of 70° or so in the objective shown in FIG. 1B, the image field is rapidly curved from an image height over about 60° of the field angle if the whole length of the objective is limited, the image field found at about 60° of the field angle is made to be under corrected up to an allowable limit for the final image and a balance in image field curvature should be made in order to provide a sufficient image quality at about 70° or so of field angle. However, although a delicate balance of image surface may be maintained in view of design, various working errors are expected during manufacturing of the lens, so in practice it is difficult to keep a sufficient final quality of image.

Thus, in order to correct the image field curvature, the radius of curvature in the composed lens should be extremely low and petzval should be decreased. When this is done an excessive coma flare is generated to cause an image having such flares.

In order to depress the generation of excessive coma flare, the overall length of the objective is generally elongated and means for gradually refracting a light beam in the objective is utilized. This type of correction will eliminate the such features as small size and little variations in distortion aberration caused by variation in magnification.

Thus, if it is possible to provide means for enabling a correction of the over-flare while overall length of the objective is kept constant, it is apparent that almost all of the disadvantages found in the objective FIG. 1B are settled, and the objects of the present invention are fulfilled.

A major feature of the present invention is to provide a means for correcting the over-flare.

The objective of the present invention shown in FIG. 3 is, as apparent from an inspection thereof, a modified form of the objective shown in FIG. 1(B), and so the features found in FIG. 1(B) are retained.

The basic difference between the objective shown in FIG. 3 and the objective shown in FIG. 1B in accordance with this invention is whether the first and second (and fifth and sixth) lenses counted from an object are cemented lens or separated lens. Both the function and the effect caused by this separated lens are important with respect to the correction of the over-flare.

In the objective of the present invention, it is possible to generate the under correction of coma flare by a rapid refraction at a radius of curvature $r_2$ (and $r_{11}$) in the inner surface of the first (and sixth) lens arranged at outermost part, and further it is possible to provide a complete correction of the over-flare by making a radius of curvature of the component lens extremely low as a means for aiming at a wide angle of lens and providing improved correction for the image field curvature.

The objective of the present invention is composed of meniscus lenses in which whole lens groups are such that a convex surface in the front group is directed against the object and a convex surface in the rear group is directed against the image. This is due to the fact that a difference of incoming angle in flux of the light for high and low angles against each of the surfaces is made low, and generation of high order aberration is depressed to maintain a mean performance over the whole image area.

Thus, in accordance with a lens configuration shown in FIG. 3, the disadvantages of the objective shown in FIG. 1B are eliminated, to establish the objects of this invention.

The condition of (I) applied in a lens configuration of the present invention is one to be applied when it is desired to have an objective which is small with little variation in the distortion aberration caused by a variation in the magnification. If the whole length of the objective is extended beyond the upper limit, the variation in the distortion aberration is substantially increased to prevent miniaturization thereof. If the whole length of the objective is shortened beyond the lower limit, it will enhance miniaturization and variation of distortion of aberration. However, it becomes difficult to make a wide angle lens due to excessive curvature in the image field under a high angle.

The condition II is one in which curvatures in the incident surface and the emergence surface of two sets of two lens groups arranged outside of the objective, i.e. the first and second lenses, and fifth and sixth lenses may be decreased as low as possible, the sum of petzval is decreased and the degree of curvature of the sagittal image surface at a high angle of view in particular is decreased to obtain a better image surface.

When radii of curvature $r_1$ and $r_4$ ($-r_{12}$ and $-r_9$) are increased over the upper limit of the condition II, the sagittal image surface is rapidly curved at higher incident angle to make the angle widening difficult. When the radius of curvature $r_1$ ($-r_{12}$) is decreased over the lower limit of the condition II, an excessive spherical aberration at under part is generated and a superior balance between the imaging field and the spherical aberration is not secured. On the other hand, when the radius of curvature $r_4$ ($-r_9$) is decreased over the lower limit of the condition II, a spherical aberration and over coma flare are generated to cause an image quality having many flares which can not be corrected sufficiently under the condition III.

The condition III is one in which over coma flare generated by a correction of image field of curvature is depressed under a whole length of lens applied by the condition I. When a power of air gap held by the first and second (fifth and sixth) lenses is increased beyond the upper limit, a coma flare at under part generated in radii of curvature $r_2$ and $r_{11}$ is rapidly increased to cause an over correction, and when the power is decreased over the lower limit, an effect of coma flare at under part generated in radii of curvature $r_2$ and $r_{11}$ is depressed by the radii of curvature $r_3$ and $r_{10}$ to prevent superior correction of the coma flare.

In addition to the above-mentioned three conditions, if the following two conditions are filled, it is possible to get a better imaging balanced having less astigmatism.

$$1.75 > f_3 = f_4 > 0.6f \quad \text{IV}$$

where, $f_3$ and $f_4$ are focal length of the third and fourth lenses.

$$0.8f > r_6 = -r_7 > 0.2f \quad \text{V}$$

The conditions IV and V are such that a degree of meniscus of the innermost third and fourth lenses holding a diaphragm therebetween is decreased, a flux of light which is entered into or exited out from these lenses is rapidly refracted and thereby an imaging field of curvature which is apt to become an excessive one under the condition II is highly acted upon the under part to get an imaging field balance having less astigmatsim.

When the power of the third and fourth lenses are decreased over the upper limit of the condition IV with respect to the condition V, inferior correction may be made to cause meridional field of curvature to be rapidly and excessively increased at a higher incident angle in particular, thereby a wide angle of view becomes difficult to develop, and to the contrary when the power is increased over the lower limit, an excessive correction is made and the meridional field of curvature at a higher incident angle becomes under correction, thereby an imaging field balance having a large astigmatism is made.

When the radii of curvature of $r_6$ and $-r_7$ are decreased over the upper limit of condition V with respect to the condition IV, an excessive correction may be made to cause an imaging field balance having a large astigmatism. When the radii of curvature $r_6$, $-r_7$ are increased over the lower limit, an inferior correction may be made to cause a wide angle of view to be difficult.

Lens configurations similar to that of the present invention, are shown in U.S. Pat. Nos. 3,871,749 and 3,088,371 in which a whole objective have meniscus shape and a front group has a convex surface directed toward the object, and in turn a back group has a convex surface directed toward the imaging field, thereby to form a symmetrical objective. U.S. Pat. No. 3,871,749 is directed toward a bright lens having the field angle of about 45° under a unity magnification and F-number of F4.5, and U.S. Pat. No. 3,088,371 is directed toward an imaging quality having a superior one within a range of about 56° of field angle under a unity magnification, and they have an object which is completely different from that of the present invention, and so it is quite difficult to get an objective of the present invention under these two patents.

Similarly, in the U.S. Pat. Nos. 3,185,031 3,438,976 symmetrical objectives are disclosed comprising six groups of six lens elements in which a first and sixth lenses are biconvex lens, a second and fifth lenses are biconcave lens. The configuration having biconvex lens and biconcave lens causes excessive difference in a refraction of flux of light at higher and lower incident angles, and so it is quite difficult to secure a mean imaging quality up to a wide angle of about 70° or so which is aimed at in the present invention.

Practical preferred embodiments of the present invention will now be indicated below.

In these embodiments, the symbols used herein are as follows.

m is the number of surface counted in sequence the object.

r is a radius of curvature of lens surface counted in sequence from the object.

d is a thickness of the lens or air gap counted in sequence from the object.

n is a refractive index with respect to a line d of the lens counted in sequence from the object.

$\gamma_d$ is Abbe number of the lens counted in sequence from the object.

f is a composite length of the objective.

l is an axial length of the whole objective.

$f_3$ and $f_4$ are focal length of the third and fourth lenses.

EXAMPLE 1

| | f = 1.0 | F9 | Field angle: 72° | |
|---|---|---|---|---|
| m | r | d | n | $\gamma_d$ |
| 1 | 0.1592 | 0.0340 | 1.62299 | 58.2 |
| 2 | 0.2373 | 0.0055 | | |
| 3 | 0.2539 | 0.0129 | 1.58144 | 40.7 |
| 4 | 0.1361 | 0.0166 | | |
| 5 | 0.2748 | 0.0122 | 1.58913 | 61.1 |
| 6 | 0.4554 | 0.0918 | | |
| 7 | −0.4554 | 0.0122 | 1.58913 | 61.1 |
| 8 | −0.2748 | 0.0166 | | |
| 9 | −0.1361 | 0.0129 | 1.58144 | 40.7 |
| 10 | −0.2539 | 0.0055 | | |
| 11 | −0.2373 | 0.0340 | 1.62299 | 58.2 |
| 12 | −0.1592 | | | |

$l = 0.25421f$ $$\frac{n_2 - 1}{r_3} + \frac{1 - n_1}{r_2} = \frac{n_5 - 1}{-r_{10}} + \frac{1 - n_6}{-r_{11}} = -0.33531/f$$

$f_3 = f_4 = 1.18f$

EXAMPLE 2

| | f = 1.0 | F9 | Field angle: 72° | |
|---|---|---|---|---|
| m | r | d | n | $\gamma_d$ |
| 1 | 0.1397 | 0.0299 | 1.58913 | 61.1 |
| 2 | 0.2167 | 0.0054 | | |
| 3 | 0.2552 | 0.0077 | 1.56138 | 42.8 |
| 4 | 0.1231 | 0.0162 | | |
| 5 | 0.2379 | 0.0096 | 1.58913 | 61.1 |
| 6 | 0.4042 | 0.0915 | | |
| 7 | −0.4042 | 0.0096 | 1.58913 | 61.1 |
| 8 | −0.2379 | 0.0162 | | |
| 9 | −0.1231 | 0.0077 | 1.56138 | 42.8 |
| 10 | −0.2552 | 0.0054 | | |
| 11 | −0.2167 | 0.0299 | 1.58913 | 61.1 |
| 12 | −0.1397 | | | |

$l = 0.2291f$ $$\frac{n_2 - 1}{r_3} + \frac{1 - n_1}{r_2} = \frac{n_5 - 1}{-r_{10}} + \frac{1 - n_6}{-r_{11}} = -0.5188/f$$

$f_3 = f_4 = 0.98f$

EXAMPLE 3

| | f = 1.0 | F9 | Field angle: 72° | |
|---|---|---|---|---|
| m | r | d | n | $\gamma_d$ |
| 1 | 0.1818 | 0.0335 | 1.65844 | 50.9 |
| 2 | 0.3033 | 0.0076 | | |
| 3 | 0.2940 | 0.0231 | 1.62004 | 36.3 |
| 4 | 0.1498 | 0.0192 | | |
| 5 | 0.3135 | 0.0115 | 1.58913 | 61.1 |
| 6 | 0.5115 | 0.0915 | | |
| 7 | −0.5115 | 0.0115 | 1.58913 | 61.1 |
| 8 | −0.3135 | 0.0192 | | |
| 9 | −0.1498 | 0.0231 | 1.62004 | 36.3 |
| 10 | −0.2940 | 0.0076 | | |
| 11 | −0.3033 | 0.0335 | 1.65844 | 50.9 |
| 12 | −0.1818 | | | |

$l = 0.2813f$ $$\frac{n_2 - 1}{r_3} + \frac{1 - n_1}{r_2} = \frac{n_5 - 1}{-r_{10}} + \frac{1 - n_6}{-r_{11}} = -0.0619/f$$

$f_3 = f_4 = 1.38f$

Figure 4:
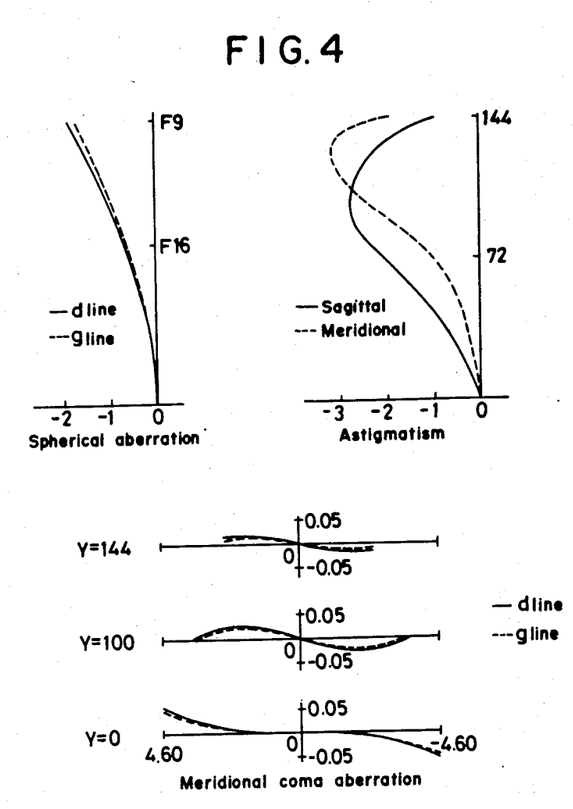
FIGS. 4, 6 and 8 show each of the aberration of respective one of the first, second and third embodiments of the present invention in which a condition of $f = 1.00$ is applied under a unity magnification.
Figure 5:
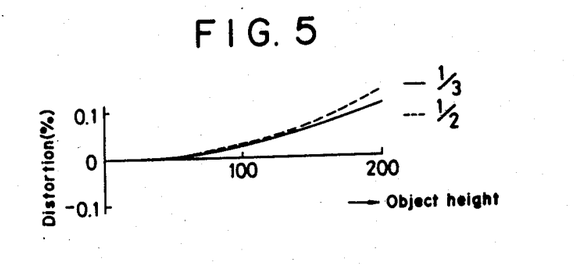
FIGS. 5, 7 and 9 are diagrammatic view indicating variations in distortion aberration caused by variation of magnification in the first, second and third embodiments of the present invention, respectively.
Figure 6:
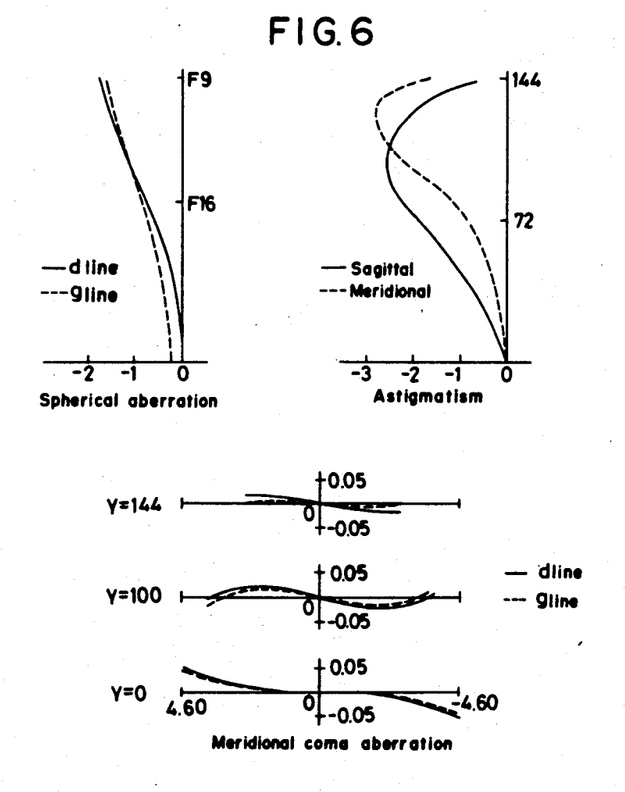
Figure 7:
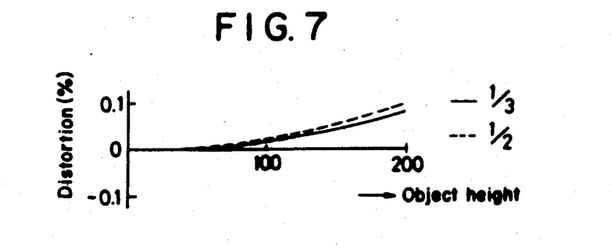
Figure 8:
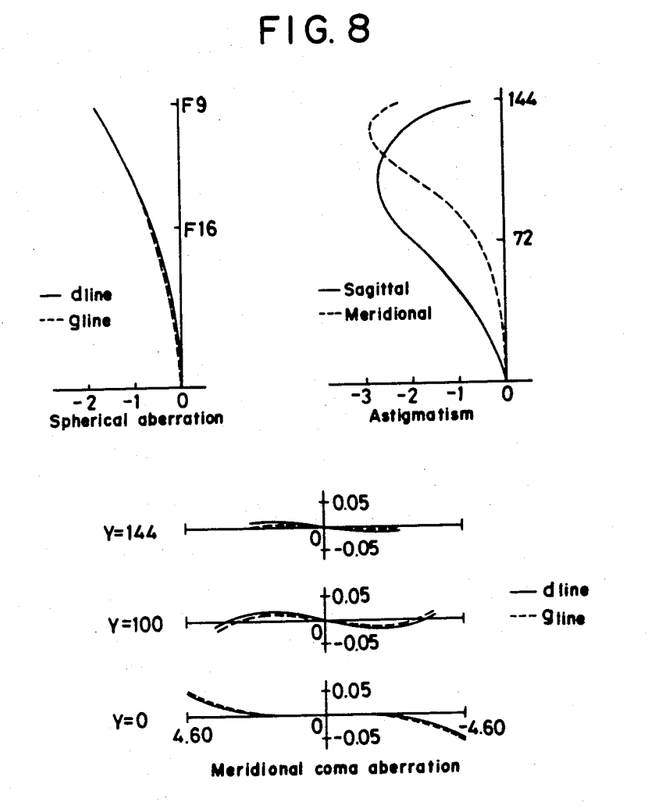
Figure 9:
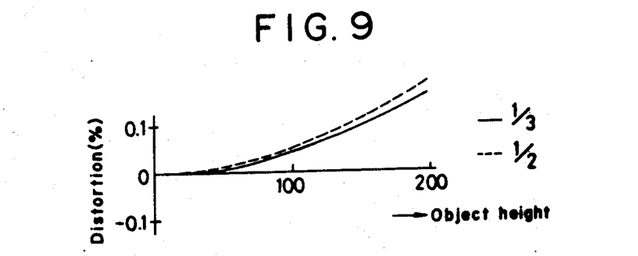

These aberration curves are as shown in FIGS. 4 to 8, and as apparent from FIGS. 4, 6 and 8, both the imaging balance and coma aberration are superior up to a field angle of 72°. As indicated in FIGS. 5, 7 and 9, few variation of distortion aberration caused by a variation of magnification from unity one to $\frac{1}{2}$ times is found, a lens configuration is simple in six groups of six lens elements, a whole length of the objective with respect to a composite focal length is less than 0.35f. These figures show that each of the correction means previously described is effective.

As described above, when the present invention is applied, it is possible to get a symmetrical objective in which it is comprised of six groups of six lens elements, a whole objective is quite small, variation of the distortion aberration caused by a variation in magnification is low, and the imaging field of curvature and coma aberration are well corrected even if the field angle under unity magnification is increased up to about 70°.

As many apparently widely different embodiments of this invention may be made without departing from the spirit and scope thereof, it is to be understood that the invention is not limited to the specific embodiments thereof except as defined in the appended claims.

What is claimed is:

1. A symmetrical objective comprising:
   a front group consisting of a first positive meniscus lens, a second negative meniscus lens, a third positive meniscus singlet lens, each of said meniscus lenses being convex to the object and a back group of a fourth, fifth, and sixth lenses arranged in complete symmetrical form with respect to a diaphragm arranged behind the third lens characterized in that the following conditions of $0.31f \geqq 1 \geqq 0.20f$      I.
$0.20f > r_1 = -r_{12} > 0.12f$      II.
$0.17f > r_4 = -r_9 > 0.11f$
$$-0.6f < \frac{n_2 - 1}{r_3} + \frac{1 - n_1}{r_2} + \frac{n_5 - 1}{-r_{10}} + \frac{1 - n_6}{-r_{11}} < -0.06f \quad \text{III.}$$

are fulfilled, where,
f: a composite focal length of whole objective
l: whole length of objective
$r_1, r_2 \ldots r_{12}$: radius of curvature of the lens counted in sequence from the object
$d_1, d_2 \ldots d_{11}$: axial space and axial thickness of the lens
$n_1, n_2 \ldots n_6$: a refractive index of the component lens with respect to line d.

2. Symmetrical objective filling the condition specified in claim 1 and constructed to the constructional data given below,

| | f = 1.0 | F9 | Field angle: 72° | |
|---|---|---|---|---|
| m | r | d | n | $\gamma_d$ |
| 1 | 0.1592 | 0.0340 | 1.62299 | 58.2 |
| 2 | 0.2373 | 0.0055 | | |
| 3 | 0.2539 | 0.0129 | 1.58144 | 40.7 |
| 4 | 0.1361 | 0.0166 | | |
| 5 | 0.2748 | 0.0122 | 1.58913 | 61.1 |
| 6 | 0.4554 | 0.0918 | | |
| 7 | −0.4554 | 0.0122 | 1.58913 | 61.1 |
| 8 | −0.2748 | 0.0166 | | |
| 9 | −0.1361 | 0.0129 | 1.58144 | 40.7 |
| 10 | −0.2539 | 0.0055 | | |
| 11 | −0.2373 | 0.0340 | 1.62299 | 58.2 |
| 12 | −0.1592 | | | | where,
m: the number of surface counted in sequence from the object
r: a radius of curvature of the lens surface counted in sequence from the object
d: a thickness of the lens or air gap counted in sequence from the object
n: a refractive index with respect to a line d of the lens counted in sequence from the object
$\gamma_d$: Abbe number of the lens counted in sequence from the object
f: a composite focal length of whole objective
l: whole length of objective
$f_3$ and $f_4$: focal length of the third and fourth lenses.

3. Symmetrical objective filling the condition specified in claim 1 and constructed according to the constructional data given below,

| | f = 1.0 | F9 | Field angle: 72° | |
|---|---|---|---|---|
| m | r | d | n | $\gamma_d$ |
| 1 | 0.1397 | 0.0299 | 1.58913 | 61.1 |
| 2 | 0.2167 | 0.0054 | | |
| 3 | 0.2552 | 0.0077 | 1.56138 | 42.8 |
| 4 | 0.1231 | 0.0162 | | |
| 5 | 0.2379 | 0.0096 | 1.58913 | 61.1 |
| 6 | 0.4042 | 0.0915 | | |
| 7 | −0.4042 | 0.0096 | 1.58913 | 61.1 |
| 8 | −0.2379 | 0.0162 | | |
| 9 | −0.1231 | 0.0077 | 1.56138 | 42.8 |
| 10 | −0.2552 | 0.0054 | | |

-continued

| | f = 1.0 | F9 | Field angle: 72° | |
|---|---|---|---|---|
| m | r | d | n | $\gamma_d$ |
| 11 | −0.2167 | 0.0299 | 1.58913 | 61.1 |
| 12 | −0.1397 | | | | where,
- m: the number of surfaces counted in sequence from the object
- r: a radius of curvature of lens surfaces counted in sequence from the object
- d: a thickness of the lens or air gap counted in sequence from the object
- n: a refractive index with respect to a line d of the lens counted in sequence from the object
- $\gamma_d$: Abbe number of the lens counted in sequence from the object
- f: a composite focal length of the objective
- l: an axial length of the whole objective
- $f_3$ and $f_4$: focal length of the third and fourth lenses.

4. Symmetrical objective filling the condition specified in claim 1 and constructed according to the constructional data given below,

| | f = 1.0 | F9 | Field angle: 72° | |
|---|---|---|---|---|
| m | r | d | n | $\gamma_d$ |
| 1 | 0.1818 | 0.0335 | 1.65844 | 50.9 |
| 2 | 0.3033 | 0.0076 | | |
| 3 | 0.2940 | 0.0231 | 1.62004 | 36.3 |
| 4 | 0.1498 | 0.0192 | | |
| 5 | 0.3135 | 0.0115 | 1.58913 | 61.1 |
| 6 | 0.5115 | 0.0915 | | |
| 7 | −0.5115 | 0.0115 | 1.58913 | 61.1 |
| 8 | −0.3135 | 0.0192 | | |
| 9 | −0.1498 | 0.0231 | 1.62004 | 36.3 |
| 10 | −0.2940 | 0.0076 | | |
| 11 | −0.3033 | 0.0335 | 1.65844 | |
| 12 | −0.1818 | | | | where,
- m: the number of surfaces counted in sequence from the object
- r: a radius of curvature of lens surface counted in sequence from the object
- d: a thickness of the lens or air gap counted in sequence from the object
- n: a referactive index with respect to a line d of the lens counted in sequence from the object
- $\gamma_d$: Abbe number of the lens counted in sequence from the object
- f: a composite focal length of the objective
- l: an axial length of the whole objective
- $r_3$ and $r_4$: focal length of the third and fourth lenses.

* * * * *

UNITED STATES PATENT AND TRADEMARK OFFICE
CERTIFICATE OF CORRECTION

PATENT NO. : 4,269,477
DATED : May 26, 1981
INVENTOR(S) : MASAMICHI KITAGAWA

It is certified that error appears in the above—identified patent and that said Letters Patent is hereby corrected as shown below:

Column 2, line 13, "Howver" should read -- However. --

Column 3, line 28, "$0.06/f < \frac{n_2 - 1}{r_3} + \frac{1 - n_1}{r_2} = \frac{n_5 - 1}{-r_{10}} + \frac{1 - n_6}{-r_{11}} <$ $-0.06/f$" should read as follows:

-- $-0.6/f < \frac{n_2 - 1}{r_3} + \frac{1 - n_1}{r_2} = \frac{n_5 - 1}{-r_{10}} + \frac{1 - n_6}{-r_{11}} < -0.06/f$ --.

Column 8, line 10 "$-0.6f < \frac{n_2 - 1}{r_3} + \frac{1 - n_1}{r_2} + \frac{n_5 - 1}{-r_{10}} + \frac{1 - n_6}{-r_{11}} <$ $- 0.06f$" should read as follows:

-- $-0.6/f < \frac{n_2 - 1}{r_3} + \frac{1 - n_1}{r_2} = \frac{n_5 - 1}{-r_{10}} + \frac{1 - n_6}{-r_{11}} < - 0.06/f$ --

Signed and Sealed this

Twenty-ninth Day of December 1981

[SEAL]

Attest:

GERALD J. MOSSINGHOFF

Attesting Officer     Commissioner of Patents and Trademarks